US012220367B2

(12) United States Patent
Stroh

(10) Patent No.: US 12,220,367 B2
(45) Date of Patent: Feb. 11, 2025

(54) CALF STRETCHER AND MEASURING DEVICE

(71) Applicant: Roger Stroh, Fargo, ND (US)

(72) Inventor: Roger Stroh, Fargo, ND (US)

( * ) Notice: Subject to any disclaimer, the term of this patent is extended or adjusted under 35 U.S.C. 154(b) by 401 days.

(21) Appl. No.: 17/588,655

(22) Filed: Jan. 31, 2022

(65) Prior Publication Data

US 2023/0240930 A1 Aug. 3, 2023

(51) Int. Cl.
*A61H 1/02* (2006.01)

(52) U.S. Cl.
CPC ... *A61H 1/0266* (2013.01); *A61H 2201/0176* (2013.01); *A61H 2201/1253* (2013.01); *A61H 2201/1635* (2013.01); *A61H 2201/1642* (2013.01); *A61H 2201/165* (2013.01); *A61H 2201/5069* (2013.01)

(58) Field of Classification Search
CPC .......... A61H 1/0266; A61H 2201/0176; A61H 2201/1253; A61H 2201/1635; A61H 2201/1642; A61H 2201/165; A61H 2201/5069
See application file for complete search history.

(56) References Cited

U.S. PATENT DOCUMENTS 6,206,807 B1 * 3/2001 Cowans ............... A61H 1/0266 482/79
7,652,953 B1 * 1/2010 Fluegge ........... A63B 21/00043 482/131
9,914,004 B2 * 3/2018 Hatfield ............... A61H 1/0266
10,206,845 B1 * 2/2019 Barouche ............. A61H 1/0237
10,357,418 B1 * 7/2019 Little ............... A63B 23/03575
2004/0215123 A1 * 10/2004 Slautterback ......... A61F 5/0111 602/23
2005/0209067 A1 * 9/2005 Backes ................ A61H 1/0266 482/92
2008/0293550 A1 * 11/2008 Campbell ............. A63B 26/00 482/121
2009/0239723 A1 * 9/2009 Jovanovic .......... A63B 21/0023 482/131
2012/0040808 A1 * 2/2012 Khademi ............. A61H 1/0277 482/124
2014/0018216 A1 * 1/2014 Hatfield ........... A63B 21/00185 482/131
2015/0297938 A1 * 10/2015 Dyer ................ A63B 21/00185 2/243.1
2015/0374572 A1 * 12/2015 Gilderman ....... A63B 21/00185 601/5

(Continued)

FOREIGN PATENT DOCUMENTS

DE 202019000742 U1 * 5/2019 ............. A61F 5/026
TW 201742602 A * 12/2017
WO WO-2019099704 A1 * 5/2019 ......... A61B 5/02055

*Primary Examiner* — Sundhara M Ganesan

(74) *Attorney, Agent, or Firm* — Fargo Patent & Business Law; Thomas Kading

(57) ABSTRACT

This application discloses a calf stretching and measuring device and a calf stretching and measuring method. The method and device pertain to a person. The device secures to a person such that a therapist may apply pressure on an extension to cause the person's calf muscle to stretch. The device is secured to the calf and foot of a person. The calf stretching method is a method in which a physical therapist or other person may use the calf stretching device.

19 Claims, 11 Drawing Sheets

(56) References Cited

U.S. PATENT DOCUMENTS

| | | | | |
|---|---|---|---|---|
| 2017/0156970 | A1* | 6/2017 | Almarales | A61H 15/0092 |
| 2019/0076692 | A1* | 3/2019 | Thorpe | A63B 23/03508 |
| 2020/0086159 | A1* | 3/2020 | Marti | A63B 23/03508 |
| 2020/0197743 | A1* | 6/2020 | Biele | A63B 21/4025 |
| 2020/0206059 | A1* | 7/2020 | DeHeer | A61F 5/042 |
| 2021/0196551 | A1* | 7/2021 | Burke | A61H 1/024 |
| 2021/0322249 | A1* | 10/2021 | Pritchard | A61B 5/14551 |
| 2022/0118307 | A1* | 4/2022 | Chapman | A63B 21/16 |

* cited by examiner

CALF STRETCHER AND MEASURING DEVICE

CROSS-REFERENCE TO RELATED APPLICATION(S)

None.

FIELD OF TECHNOLOGY

This disclosure generally relates to muscle stretching devices and methods of using the stretching devices.

BACKGROUND

Calf muscles are located at the back of a person's lower leg. The calf muscle is generally below the knee and extends to the ankle. Calf muscles often need to be stretched for various reasons. For example, a calf muscle may need to be stretched due to injury, strain, cramping, or other physiological conditions. Calf muscles may be relatively strong compared to many other muscles in a person's body. A strong calf muscle may take a relatively significant amount of force to stretch. When a calf muscle requires stretching, the stretch may require even more force.

Physical therapy is a health activity wherein a physical therapist often assists a patient in stretching a calf muscle. Physical therapists often assist in the maintenance and management of the musculoskeletal system. Physical therapists and patients are people who range in size and strength. When a patient is a large person and the therapist is a small person, the therapist may struggle to stretch a calf muscle fully. A large patient may correspondingly have larger calf muscles than a small patient with small muscles. A patient with large muscles may require more strength from the therapist to properly perform a stretch.

Physical therapists often struggle to stretch a calf muscle of a patient properly. As a result, physical therapists have a long-felt need to develop new devices and methods to stretch a calf muscle properly.

SUMMARY

The present invention disclosed herein includes a device for stretching a patient's calf muscle and the method to use the device. The device and method are applicable specifically to a human being. Though the device has a preferred embodiment for stretching the calf muscle, the device may be used to stretch other muscles or biological structures. For example, the calf stretcher allows a small therapist to stretch a large patient's calf muscles.

The device invention may be referenced herein as the calf stretcher. The calf stretcher is comprised of a calf brace, a footrest, a hinge, and an extension. The calf stretcher may be further comprised of a handle, a foot strap, an angle gauge, a calf brace strap, a safety stop, and other elements. The calf stretcher may be secured to the calf and foot of a patient. The hinge connects the footrest to the calf brace. The hinge allows the footrest and the calf brace to change angles in relation to each other. The calf and the foot similarly may change angles in relation to each other. The hinge allows the calf stretcher to have a similar change in angle as the calf and the foot. When pressure is applied to the end of the extension distal from the hinge, the calf stretcher may apply force upon a patient's foot thereby causing the calf to stretch.

The method invention may be referenced herein as the calf stretching method.

The calf stretching method comprises securing the calf stretcher to the patient and applying pressure to the extension. The calf stretching method may further comprise of measuring the stretch, reclining the patient on a horizontal surface, and holding the stretch. A therapist may use professional judgment to determine the pressure applied to the extension. Different amounts of pressure may determine the extent of the stretch.

BRIEF DESCRIPTION OF THE DRAWINGS

These and other features and advantages of the present invention will become more readily appreciated as the same becomes better understood by reference to the following detailed description when considered in connection with accompanying drawings, wherein.

DETAILED DESCRIPTION OF THE ILLUSTRATED EMBODIMENTS

General

The present invention will now be described with occasional reference to the specific embodiments of the invention. However, this invention may be embodied in different forms and should not be construed as limited to the embodiments set forth herein. Rather, these embodiments are provided so that this disclosure will be thorough and complete and fully convey the invention's scope to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to limit the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties outlined in the specification and claims are approximations that may vary depending on the desired properties sought to be obtained in embodiments of the present invention. Notwithstanding that the numerical ranges and parameters setting forth the broad scope of the invention are approximations, the numerical values outlined in the specific examples are reported as precisely as possible. However, any numerical values inherently contain certain errors necessarily resulting from errors found in their respective measurements.

Figures Detail

Figure 1:
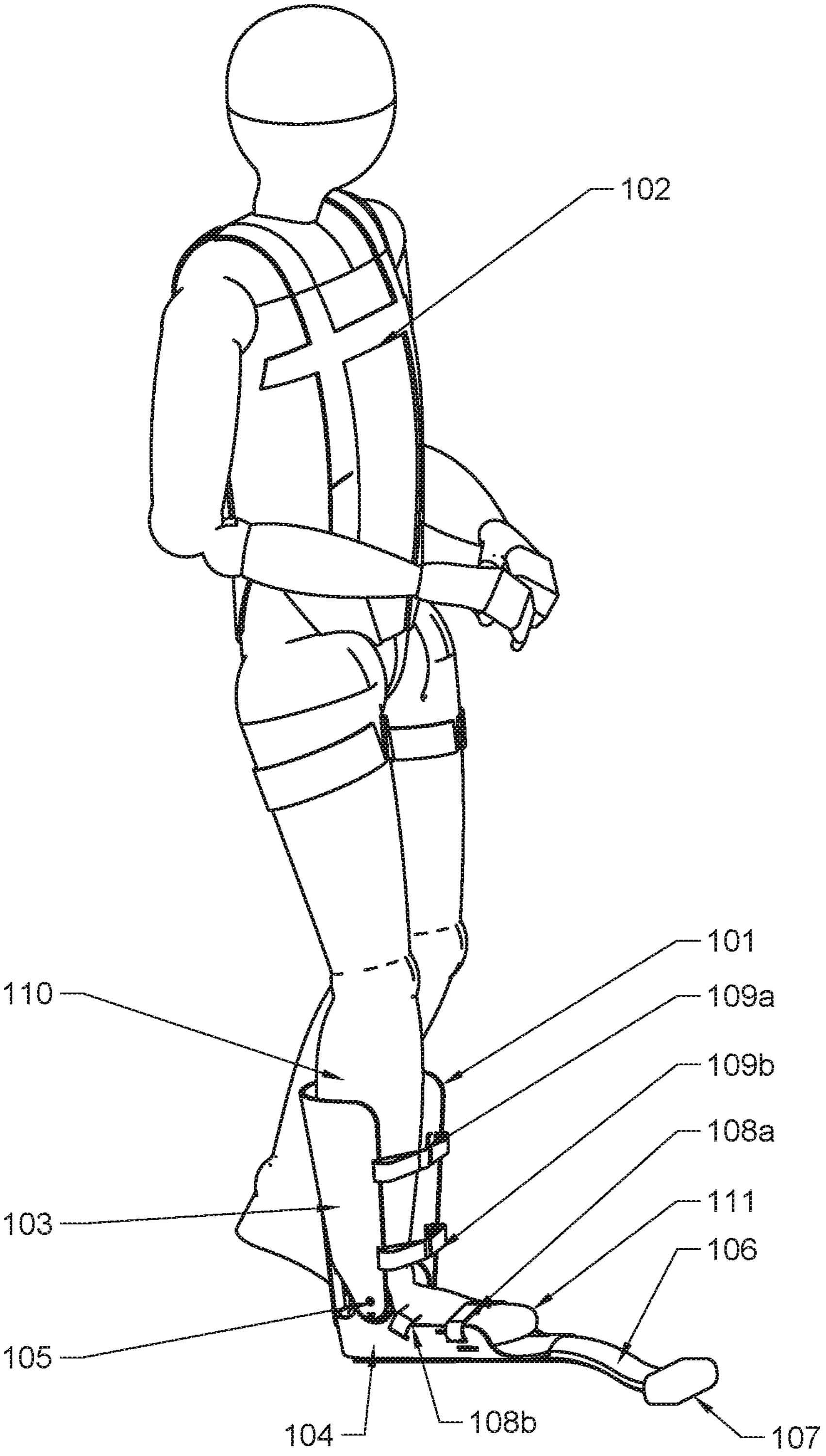
FIG. 1 is an exemplary 3D view of the calf stretching device secured to a person.

FIG. 1 is an exemplary 3D view of the calf stretching device secured to a person 102. The calf stretching device invention may be referenced herein as the calf stretcher 101. The calf stretcher 101 is comprised of a calf brace 103, a footrest 104, a hinge 105, and an extension 106. The calf stretcher 101 may be further comprised of a handle 107, a foot strap 108, an angle gauge, a calf brace strap 109, a safety stop, and other elements. The calf stretcher 101 may be secured to the calf 110 and foot 111 of a patient. The hinge 105 connects the footrest 104 to the calf brace 103. The hinge 105 allows the footrest 104 and the calf brace 103 to change angles in relation to each other. The calf 110 and the foot 111 similarly may change angles in relation to each other. The hinge 105 allows the calf stretcher 101 to have a similar change in angle as the calf 110 and the foot 111. When pressure is applied to the end of the extension 106 distal from the hinge 105, the calf stretcher 101 may apply a force upon a patient's foot 111, thereby causing the calf muscle to stretch.

Calf muscles are located at the back of a person's lower leg. The calf muscle is generally below the knee and extends to the ankle. Calf muscles often need to be stretched for various reasons.

The foot strap 108 may be comprised of multiple straps. The foot strap 108 may be attached to the footrest 104. For example, the figures show that there may be a first foot strap 108*a* and a second foot strap 108*b*. The multiple straps comprising the foot strap 108 may be referenced herein collectively as the foot strap 108. The foot strap 108 may be attached to the footrest 104 using a fastener, a hole in the footrest 104 through which the foot strap 108 may be looped, or any other variation. Multiple attachment points 401 may be utilized where the foot strap 108 may be attached. The foot strap 108 is not an essential element of the calf stretcher 101.

The calf brace strap 109 may be comprised of multiple straps. The calf brace strap 109 may be attached to the calf brace 103. As shown in the figures there may be a first calf brace strap 109*a* and a second calf brace strap 109*b*. The multiple straps comprising the calf brace strap 109 may collectively be referenced as the calf brace strap 109. The calf brace strap 109 may be attached to the calf brace 103 using a fastener, a hole in the calf brace 103 through which the calf brace strap 109 may be looped, or any other variation. Multiple attachment points may be utilized where the foot strap 108 may be attached. The calf brace strap 109 is not an essential element of the calf stretcher 101.

The method invention may be referenced herein as the calf stretching method. The calf stretching method comprises securing the calf stretcher 101 to a person 102 and applying pressure to the extension 106. In one embodiment, the calf stretching method may be performed by the person to whom the calf stretcher 101 is secured. When the calf stretching method is performed by the person to whom the calf stretcher 101 is secured, the method may be referenced as self stretching. After the calf stretcher 101 is secured to the person, the person may proceed to standing on a surface 112. While initially standing, the angle between the calf 110 and the foot 111 will roughly be 90 degrees. The person may then begin leaning forward such that the angle becomes more acute and less than 90 degrees. As the person is leaning forward, pressure is applying from the surface to the extension 106. The amount of leaning may determine the amount of pressure applied to the extension 106. The person may continue holding position such that pressure is continually applying such to cause continued stretching of the calf muscle.

The calf stretching method may further comprise of measuring the stretch, reclining the patient on a horizontal surface, and holding the stretch. Different amounts of pressure may determine the extent of the stretch.

Figure 2:
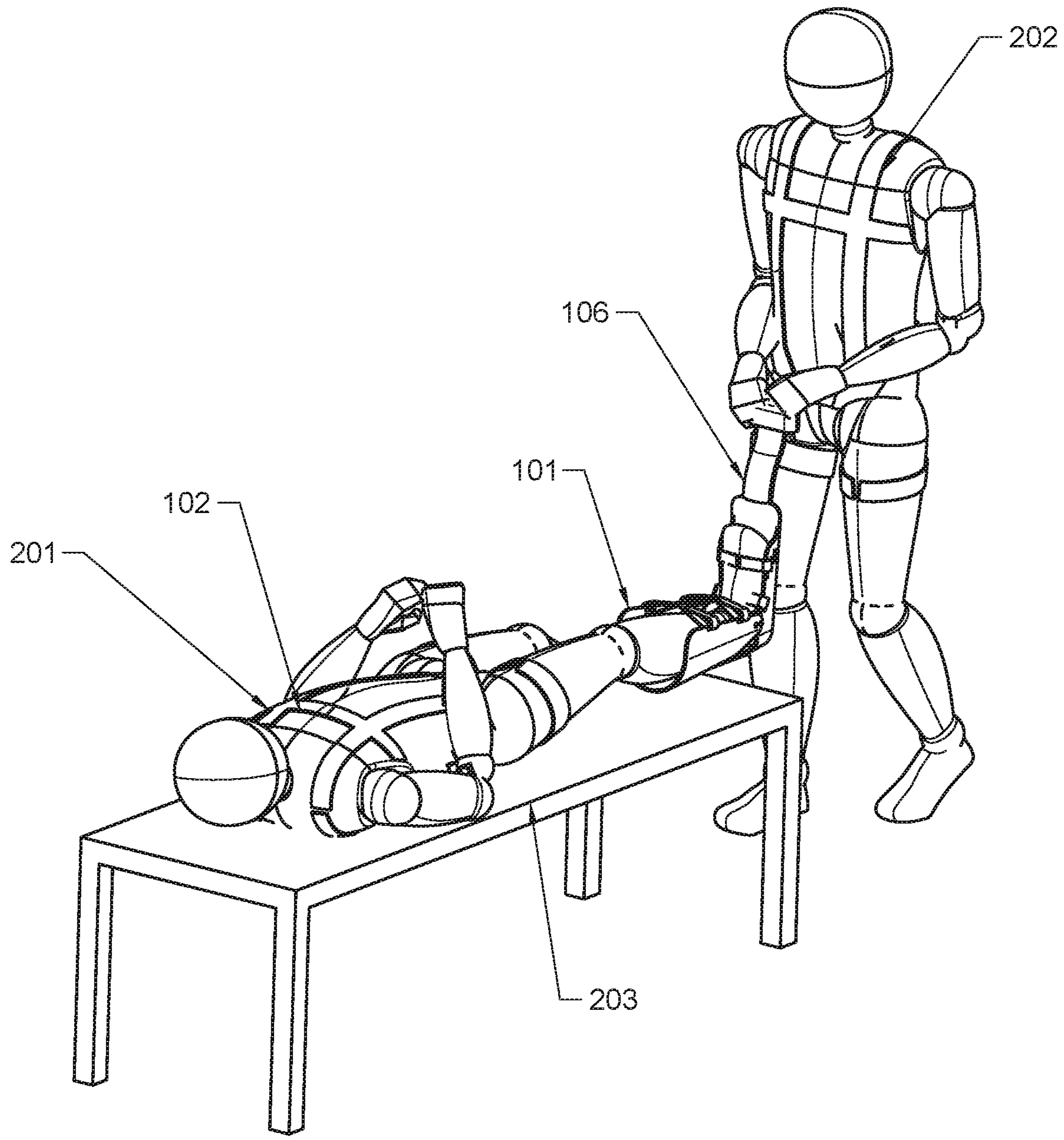
FIG. 2 is an exemplary 3D view of the calf stretching device secured to a person and a therapist performing the calf stretching method.

FIG. 2 is an exemplary 3D view of a calf stretcher 101 device secured to a person 102 and a therapist 202 performing the calf stretching method. The person 102 when the calf stretching method is being performed by a therapist 202 may be considered the patient 201. A therapist 202 may be a health specialist known as a physical therapist. A physical therapist often assists in maintaining and managing the musculoskeletal system. For example, a patient who suffered an injury to their calf or leg may seek assistance from a therapist 202. The patient may have a health condition that requires their calf to be stretched. Further, the patient may be physically incapable of performing the calf stretching method by self stretching. In such a situation, the patient may be required to be assisted by a therapist 202 to perform the calf stretching method using the calf stretcher 101.

When performed by a therapist, the calf stretching method comprises securing the calf stretcher 101 to the patient 201 and applying pressure to the extension 106. The calf stretching method may further comprise reclining the patient, measuring the stretch, and holding the stretch.

The calf stretcher 101 may be secured to the patient 201 using straps, clamps, interference fit, or other such methods. The figures show that the calf brace 103 may be secured to the calf 110 using at least one calf brace strap 109. Likewise, the footrest 104 may be secured to the foot 111 using at least one foot strap 108.

The therapist 202 may begin applying pressure to the extension 106 to cause the patient's calf muscle to stretch. In one embodiment, one of the patient's calf muscles is stretched at a time. Alternatively, the calf stretcher 101 may be configured to stretch both of a patient's calf muscles simultaneously. In such embodiment, both the calves and feet must be secured to the calf stretcher 101.

Reclining a patient 201 is the act of causing a patient 201 move to a position that is less than a vertical standing position relative to the surface prior to applying pressure. For example, in FIG. 2 the patient 201 is reclining on a table 203. In this example, the patient 201 is reclining horizontally relative to the surface of the floor. Reclining horizontally allows for the therapist 202 to apply pressure on the extension 106 while adjacent to the patient 201. Alternatively, the patient 201 may be reclined in a chair wherein the patient 201 is not fully horizontal with the floor surface.

As pressure is applying to the extension 106 the relative angle between the footrest 104 and the calf brace 103 decreases and becomes more acute. As the relative angle decreases the calf muscle is caused to be stretched. The manner in which the relative angle may be undergo measuring is described in more detail with the description of FIG. 4.

Holding pressure on the extension 106 is the act of continually applying pressure on the extension 106. Holding a stretch is a common practice to ensure the proper stretching of a particular muscle. In this case, holding the stretch on a calf muscle may be a practice desired or recommended for a person 102 or patient 201. For example, a therapist may recommend holding a stretch for a period of time. Some recommend holding a stretch of 30 seconds and some say 60 seconds or even more. This recommendation is based on the particular person 102 or patient 201 undergoing the calf muscle stretching.

A therapist may use professional judgment to determine the pressure applied to the extension. Different amounts of pressure may determine the extent of the stretch.

Physical therapy is a health activity wherein a physical therapist 202 often assists a patient to stretch a calf muscle. A therapist 202 and a patient 201 are people with a range in size and strength. When a patient 201 is a large person and the therapist 202 is a small person, the therapist 202 may struggle to stretch a patient's calf muscle fully. A large patient may correspondingly have larger calf muscles than a small patient with small muscles. A patient 201 with large muscles may require more strength of the therapist 202 to perform a stretch properly. The calf stretcher 101 allows for a small therapist to stretch a large patient's calf muscles.

Figure 3:
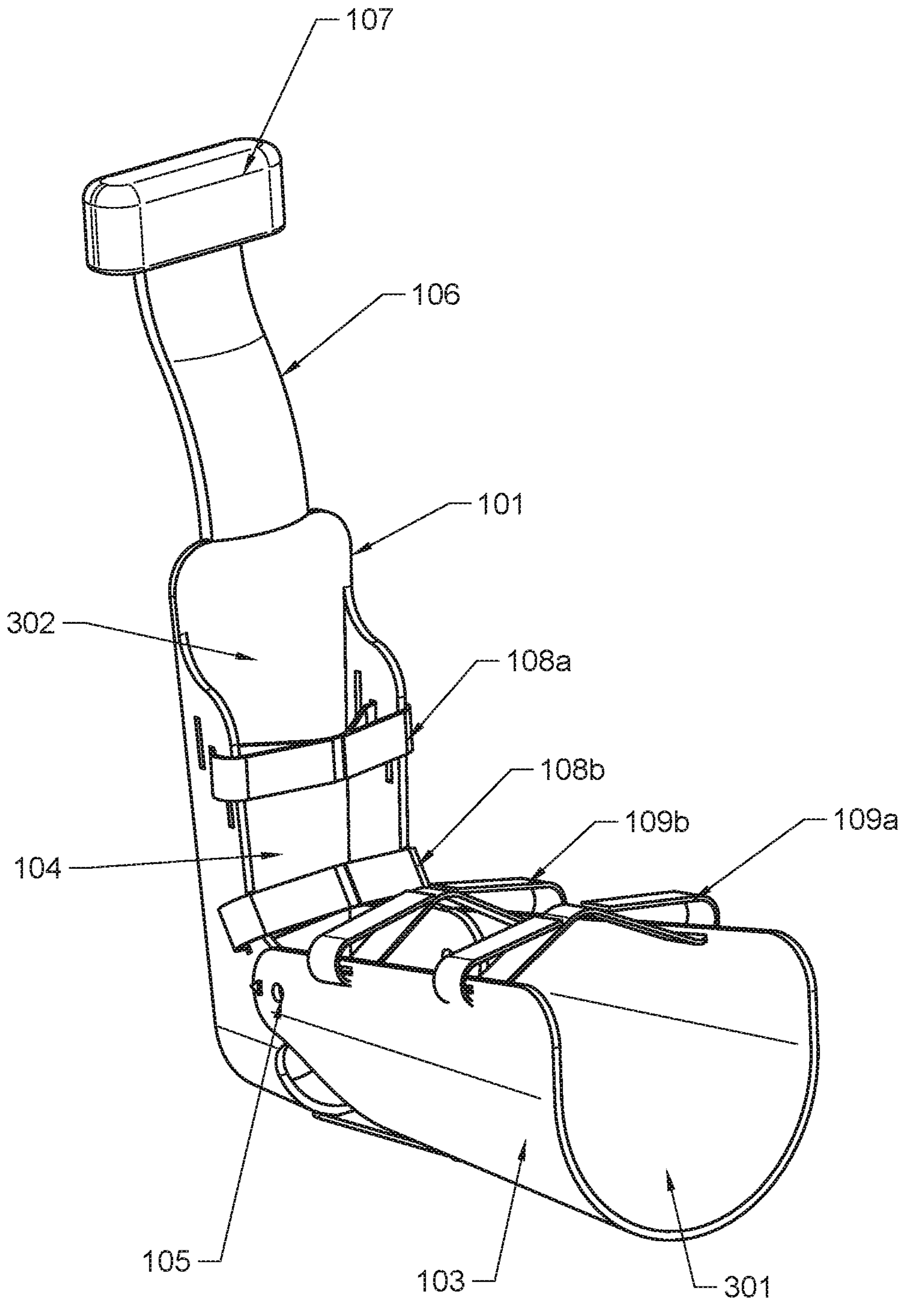
FIG. 3 is an exemplary 3D view of the calf stretching device from a first perspective.

A calf muscle may be very tight and therefore difficult to stretch. The extension 106 allows for a patient 201 and a therapist 202 to utilize leverage to increase the moment at the hinge 105. A moment may also be called torque. When force is applied to the extension 106 in a direction toward the footrest 104 that is relatively perpendicular to the bottom of a footrest surface 302, a moment is created at the hinge 105. A foot 111 that is secured to the footrest 104 is forced to bend relative to the calf 110 at the ankle when a moment is present. This bending causes the calf muscle to stretch. When the calf muscle is tight and therefore difficult to stretch, the leverage which can be utilized by use of the extension allows for less force required to create the needed moment to cause the calf to stretch. The longer the extension 106, the more leverage is provided. The more leverage provided, the less force perpendicular to the footrest surface 302 is required to cause the calf muscle to stretch. FIG. 3 is an exemplary 3D view of a calf stretcher 101 from a first perspective. The calf stretcher 101 is comprised of a calf brace 103, a footrest 104, a hinge 105, and an extension 106. In addition, the calf stretcher 101 may be further comprised of a handle 107, a foot strap 108, an angle gauge, a calf brace strap 109, a safety stop, and other elements.

The calf brace 103 is connected to the footrest 104 by a hinge 105. The calf brace 103 and the footrest 104 may rotate relative to each other along the axis of the hinge 105. The calf brace 103 may be shaped to conform to the calf 110 of a person 102 ergonomically. The calf 110 as referenced herein is generally understood to be the leg portion that extends from a person's knee to the person's ankle. The ankle is the joint where the foot 111 and the calf 110 meet. Therefore, the ankle is where the calf 110 and the foot 111 may bend in relation to each other.

A calf brace 103 may be secured to the back of a person's calf 110. The calf brace 103 does not need to extend the entire length of the calf 110. For example, the calf brace 103 does not need to extend the entire distance from the ankle to the knee. The calf brace 103 may extend from the hinge 105 to two-thirds of the distance to the knee. The calf brace 103 may be of any length capable of securing a person's calf 110. To secure the calf brace 103 to the calf 110, at least one calf brace strap 109 may be used. A calf 110 may be secured in the calf brace 103 such that the calf 110 is aligned with the back face 301 of the calf brace 103. The back of the calf 110 represents the surface of the calf at the rear of the person 102.

A footrest 104 may be secured to the foot 111 of a person 102. To secure the footrest 104 to a foot 111, the bottom of the foot 111 must be placed on the footrest surface 302. When the foot 111 and the calf 110 is secured in the calf stretcher 101 as described, the hinge 105 and the ankle are positioned relative to each other such that the foot 111 and the footrest 104 may rotate in relation to the calf brace 103 and the calf 110 with a similar pivot location. The pivot location is understood to be the location where the calf 110 and foot 111 bend at the ankle and the footrest 104 and calf brace 103 bend at the hinge 105. As the calf 110 and the foot 111 bend relative to each other, the calf 110 may be stretched. When the calf 110 and foot 111 is secured to the calf stretcher 101, force applied to the extension 106 causes the calf 110 and the foot 111 to bend relative to each other thereby causing the calf 110 to stretch.

The hinge 105 may be manufactured and configured in many different embodiments. An exemplary embodiment of the hinge 105 is one as shown in the figures. In the figures, the hinge 105 is comprised of two connections between the footrest 104 and the calf brace 103 on opposite sides of where the ankle would be positioned when the calf stretcher 101 is secured to a person 102. The hinge 105 may be configured alternatively. For example, the calf brace 103 and the footrest 104 may be molded such that the two pieces hingedly interlock. This may be considered a molded interlock. Alternatively, a rivet or other fastener may hingedly connect the footrest 104 and calf brace 103.

The extension 106 may be connected to the footrest 104. The extension 106 and the footrest 104 may be manufactured as on solid objects or may comprise multiple pieces. For example, the footrest 104 and extension 106 may be manufactured as separate objects and be connected together. For example, the extension 106 may be glued or fastened to the footrest 104. The extension 106 may be manufactured from multiple material types and multiple pieces. For example, the extension 106 may comprise a metal rod embedded in a second material such as a plastic. The metal rod may provide for additional structural strength.

The handle 107 may be connected to the extension 106 to provide a spot upon which a therapist 202 or other person may apply pressure to stretch a calf 110. The handle 107 may be generally perpendicular to the extension 106 as shown in the figures, or may be configured at any other orientation relative to the extension 106. The handle 107 may be manufactured from a material different than the extension 106. For example, the handle 107 may have a grip tape material coating.

The calf stretcher 101 may be manufactured in a variety of sizes. For example, the calf stretcher 101 may be manufactured to work with adolescents, children, large adults, small adults, or any other size. Different people have different width feet and calves which may require various sized footrests.

Figure 4:
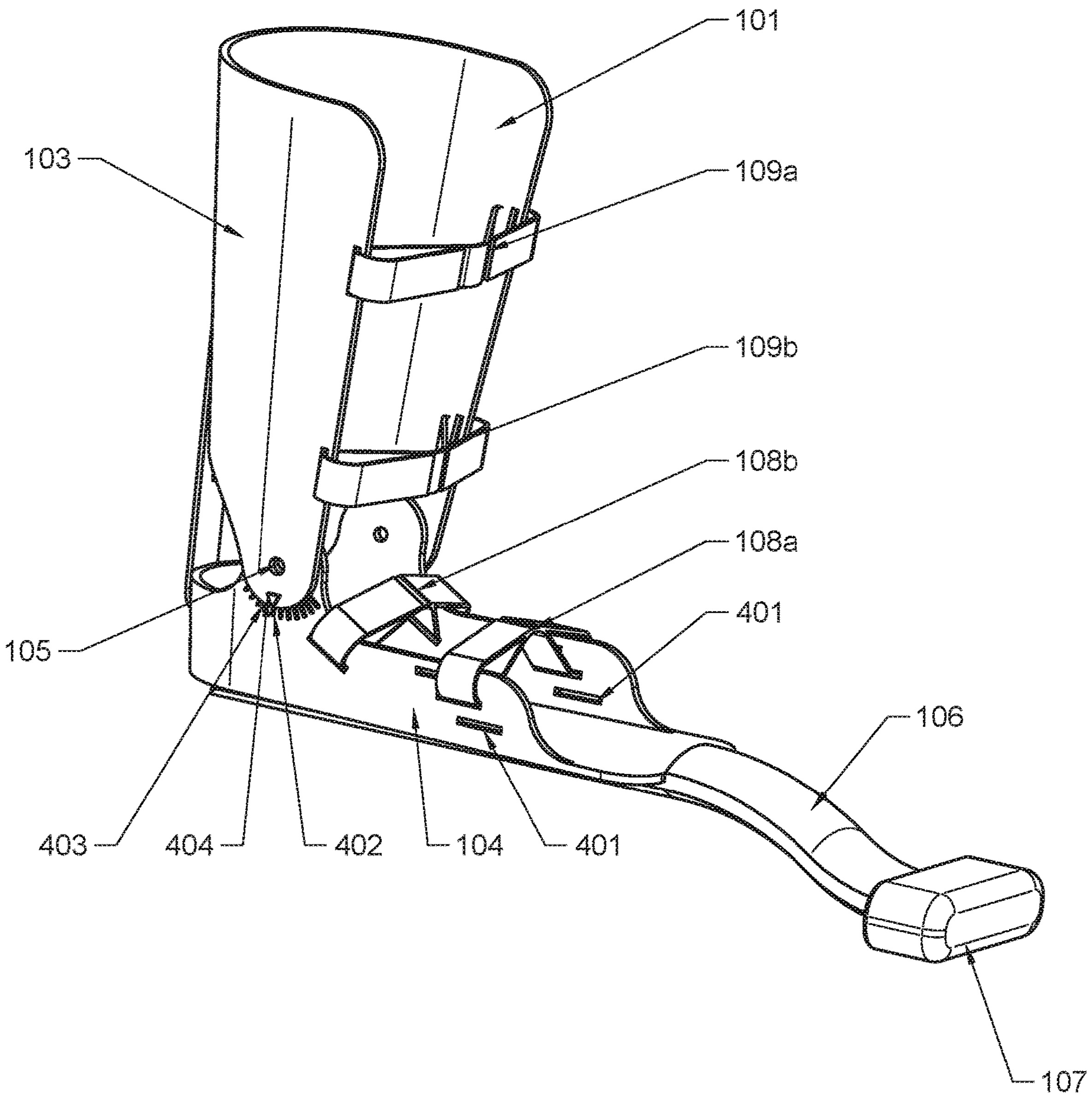
FIG. 4 is an exemplary 3D view of the calf stretching device from a second perspective.

FIG. 4 is an exemplary 3D view of the calf stretcher 101 from a second perspective. In the shown embodiment, the calf stretcher 101 is further comprised of an angle gauge 402. The angle gauge 402 may be configured for measuring the relative angle between the calf brace 103 and the footrest 104, thereby also showing the relative angle between the calf 110 and the foot 111. The angle between the calf brace 103 and the footrest 104 may be referenced as the relative angle to each other. One embodiment of the angle gauge 402 is such that 0-degrees on the angle gauge 402 represents a 90-degree relative angle between the calf brace 103 and the footrest 104. The angle gauge 402 may be useful to a therapist 202 or the person 102 secured to the calf stretcher 101 in determining the amount of stretch. An exemplary embodiment of the angle gauge 402 may comprise a marker 403 fixed on the calf brace 103 and a degree diagram 404 fixed on the footrest 104. The degree diagram 404 displays the relative angle. As the angle between the calf brace 103 and the footrest 104 changes, the marker 403 indicates a changing relative angle measurement on the degree diagram 404.

Figure 5:
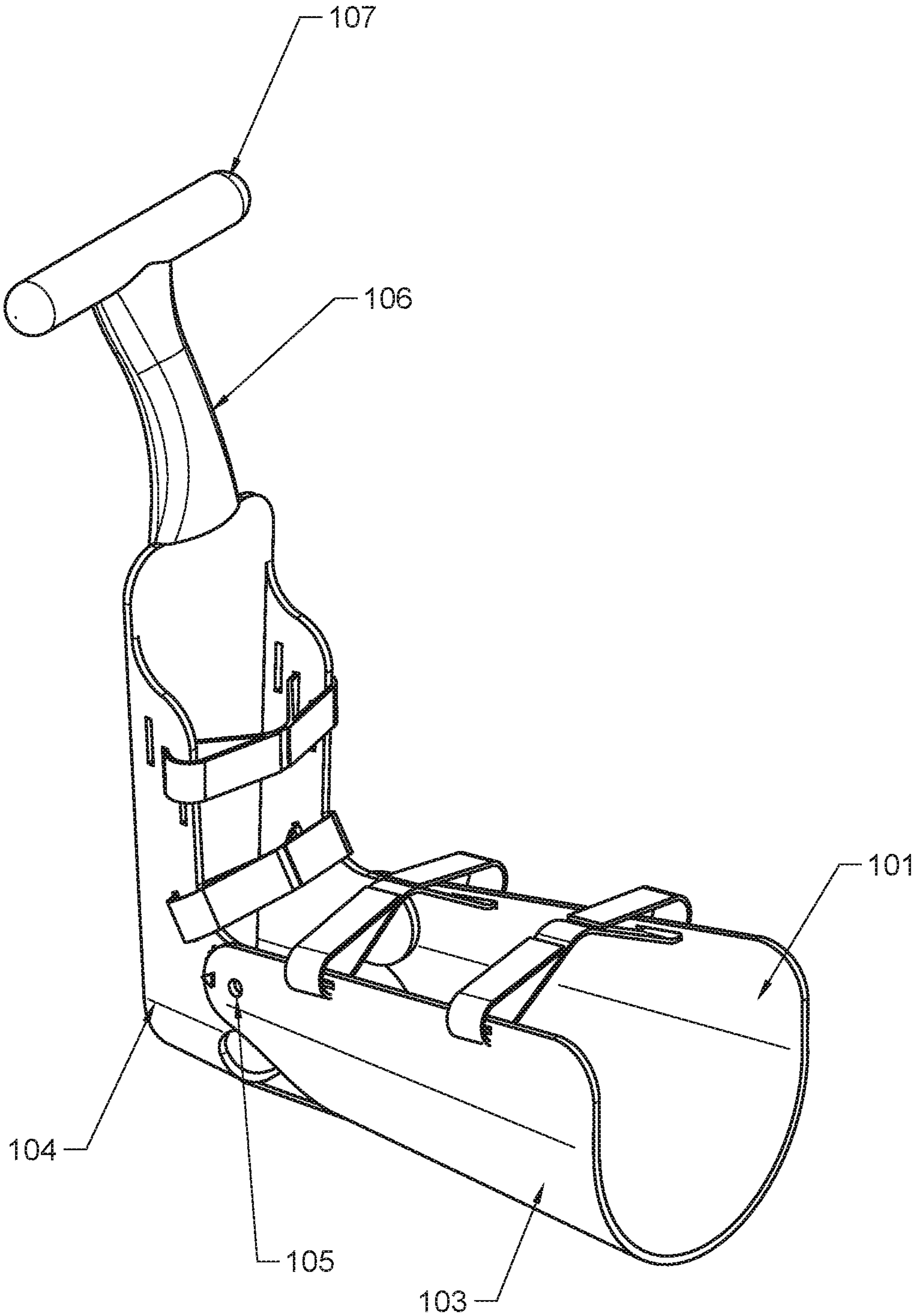
FIG. 5 is an exemplary 3D view of the calf stretching device from a third perspective.

FIG. 5 is an exemplary 3D view of the calf stretcher 101 from a third perspective. As shown in the figure a round shaped handle 107 may be utilized.

Figure 6:
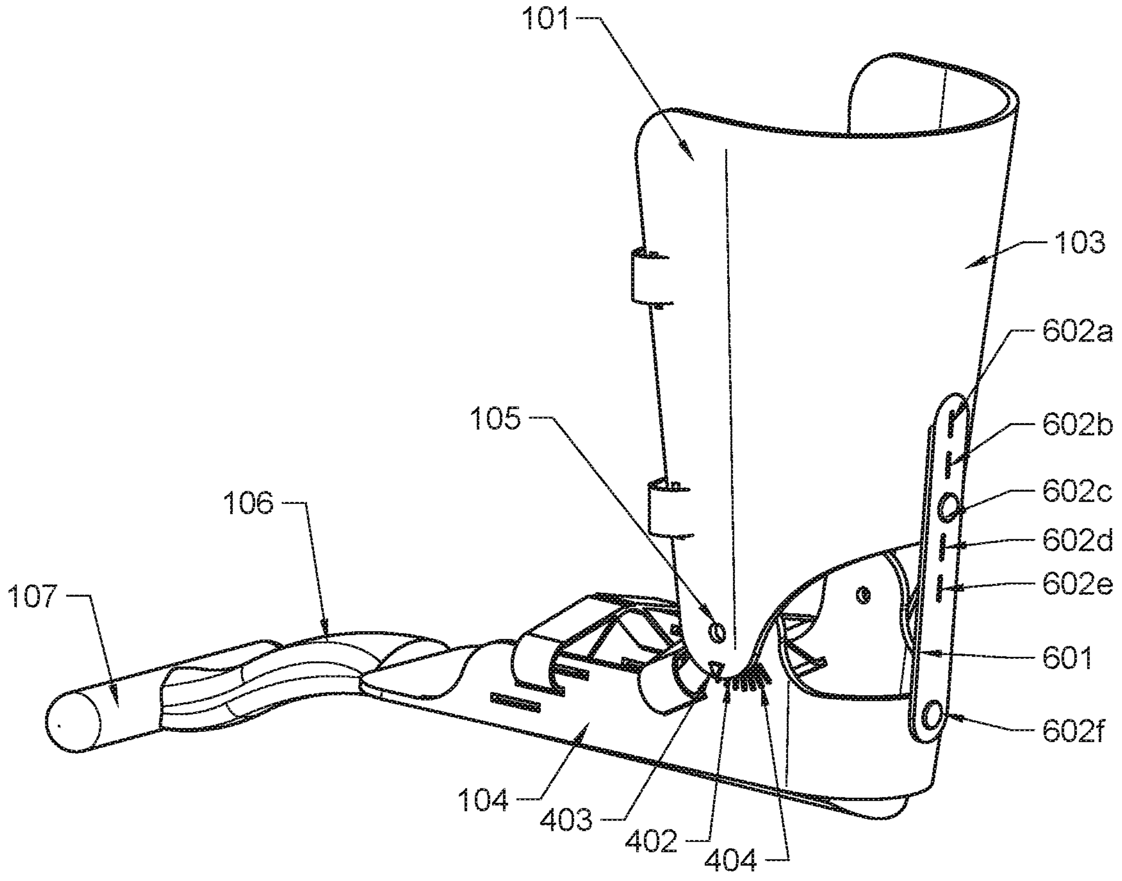
FIG. 6 is an exemplary 3D view of the calf stretching device from a fourth perspective showing a hard stop strap.

FIG. 6 is an exemplary 3D view of the calf stretcher 101 from a fourth perspective showing a hard stop strap 601. The hard stop strap 601 may be attached to the calf brace 103 and the footrest 104. The hard stop strap 601 may be a material which is strong in tension and weak in compression. Strong in tension limits the amount of rotation in one direction whereas weak in compression allows rotation in the other direction. When the hard stop strap 601 is attached, the amount of rotation which the calf brace 103 and the footrest 104 may bend relative to each other is limited. The footrest 104 and calf brace 103 may be limited in bend when the hard stop strap 601 is attached. The bend may also be measured as the relative angle. The hard stop strap 601 may be attached to the calf brace 103 at a connection point 602. The level of limitation may be adjusted by attaching the hard stop strap 601 at different connection points. The hard stop strap 601 provides a limit to the bend between the footrest 104 and the calf brace 103. The hard stop strap 601 may comprise of adjustable multiple connection points. As an example, the connection point may include a first connection point 602*c*, a second connection point 602*f*, a third connection point 602*a*, a fourth connection point 602*b*, a fifth connection point 602*d*, a sixth connection point 602*e*, and additional connection points.

The calf stretcher 101 may also be configured with a safety stop. The safety stop may be a feature, such as a protruding notch or key, on either or both of the calf brace 103 and the footrest 104, limiting the bend between the two.

Figure 7:
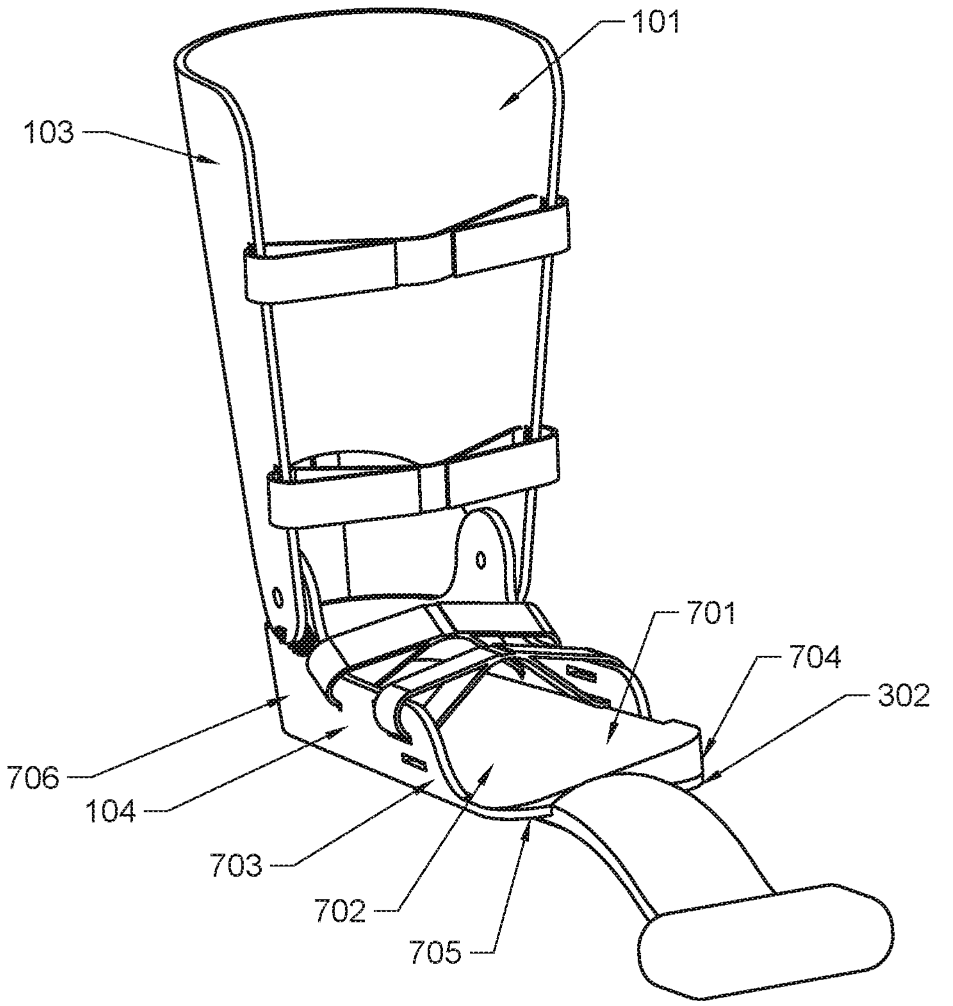
FIG. 7 is an exemplary 3D view of the calf stretching device with an angle plate.

FIG. 7 is an exemplary 3D view of the calf stretcher 101 with an angle plate 701. The angle plate 701 is installed on the footrest surface 302. The foot 111 of a person 102 may be secured to the footrest 104 such that the bottom of the person's foot 111 is placed on the angle plate 701. The angle plate 701 provides for an inclined surface 702 under the person's foot 111. The inclined surface 702 allows for uneven pressure upon the bottom of the foot 111 while the calf stretcher 101 is being used to stretch the calf muscle. The uneven pressure may cause increased inversion or eversion on the foot 111 while stretching the calf muscle with the calf stretcher 101.

The calf stretcher 101 may have an inward side 703 and an outward side 704. The calf stretcher 101 may be symmetrical in shape or may be formed to the natural shape of a foot 111. The inward side 703 represents the side of the footrest 104 which is adjacent to the instep of the foot 111 when the foot is placed on the footrest 104. The instep is opposite of the outstep. The outward side 704 represents the side of the footrest 104 which is adjacent to the outstep of the foot 111 when the foot is placed on the footrest 104. The outstep is the side of the foot 111 with the cuboid bone. The angle plate 701 may be configured such that the inclined surface 702 is sloped upward from the inward side 703 up to the outward side 704, or it may be configured to slope upward from the outward side 704 to the inward side 703. The inclined surface 702 may be configured as desired by a person 102 or therapist to achieve the desired result.

An inversion is the inward tilt of the foot 111 such that the inclined surface 702 is sloped up from the outward side 704 to the inward side 703. An eversion is an outward tilt of the foot 111 such that the inclined surface 702 is sloped up from the inward side 703 to the outward side 704. Installing an angle plate 701 may be useful for stretching specific parts of the calf 110, may be useful for causing the foot 111 to adjust, or for other purposes. Different individuals have different levels of inversion or eversion and an angle plate 701 may be necessary to properly fit the calf stretcher 101 to a particular person 102. The angle plate 701 may be installed on the footrest surface 302 prior to securing a person's foot 111 to the calf stretcher 101.

The footrest 104 may have a front 705 and a back 706. The front 705 is aligned with the location where toes on a foot 111 will be located when the foot 111 is secured to the footrest 104. The back 706 is aligned with the location where heel on a foot 111 will be located when the foot 111 is secured to the footrest 104. The angle plate 701 may be configured with an inclined surface 702 that is sloped up from the front 705 to the back 706 or from the back 706 to the front 705. The angle plate 701 may comprise of both a slope between the inward side 703 and the outward side 704 as well as a slope between the front 705 and the back 706. Alternatively, the angle plate 701 may be configured with only one slope.

Figure 8:
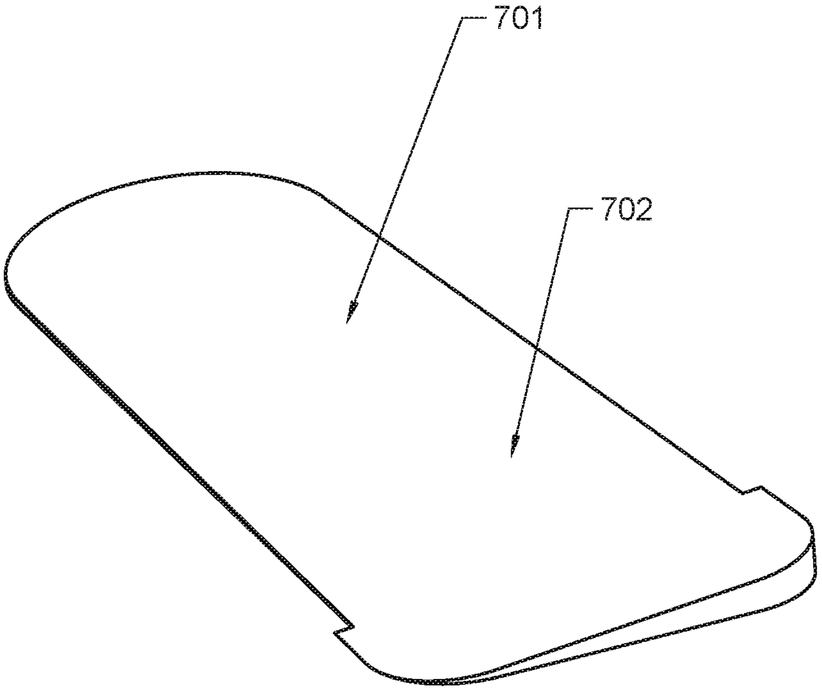
FIG. 8 is an exemplary 3D view of an angle plate with a 5-degree incline.

FIG. 8 is an exemplary 3D view of an angle plate 701 with a 5-degree inclined surface 702. The angle plate 701 may be configured in any shape that allows for the angle plate 701 to be installed on the footrest surface 302.

Figure 9:
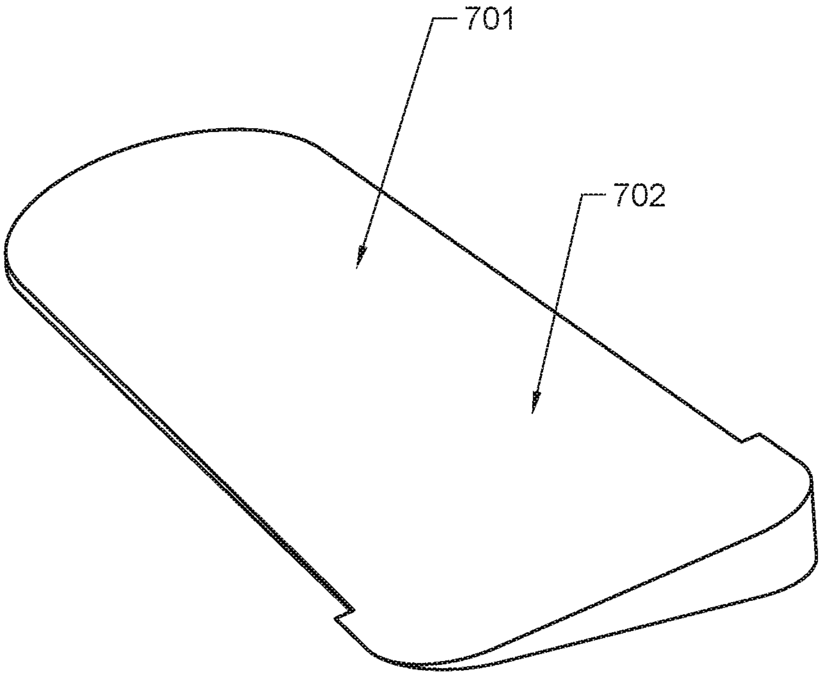
FIG. 9 is an exemplary 3D view of an angle plate with a 10-degree incline.

FIG. 9 is an exemplary 3D view of an angle plate 701 with a 10-degree inclined surface 702. An angle plate 701 with a greater slope represents a greater inversion or eversion.

Figure 10:
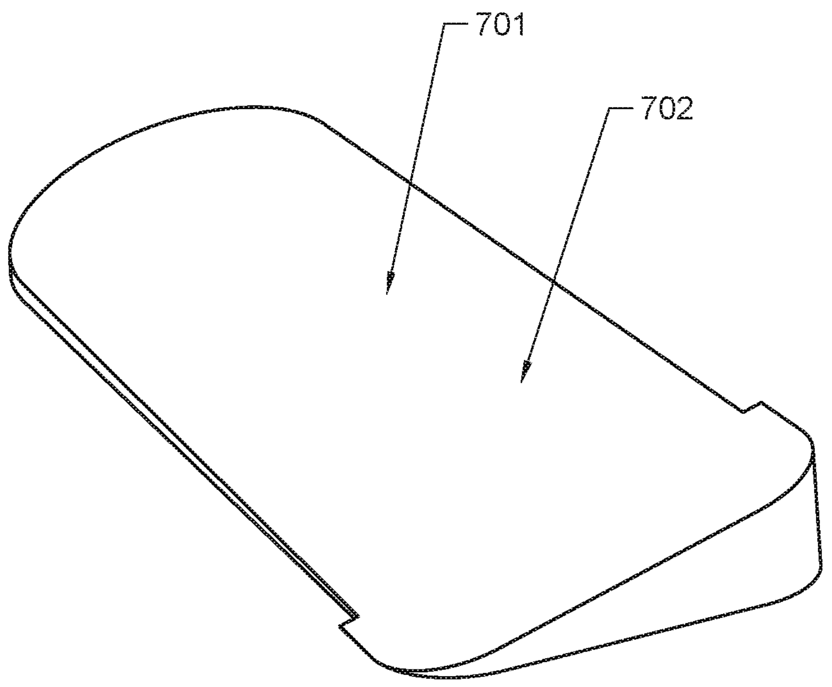
FIG. 10 is an exemplary 3D view of an angle plate with a 15-degree incline.

FIG. 10 is an exemplary 3D view of an angle plate 701 with a 15-degree inclined surface 702.

Figure 11:
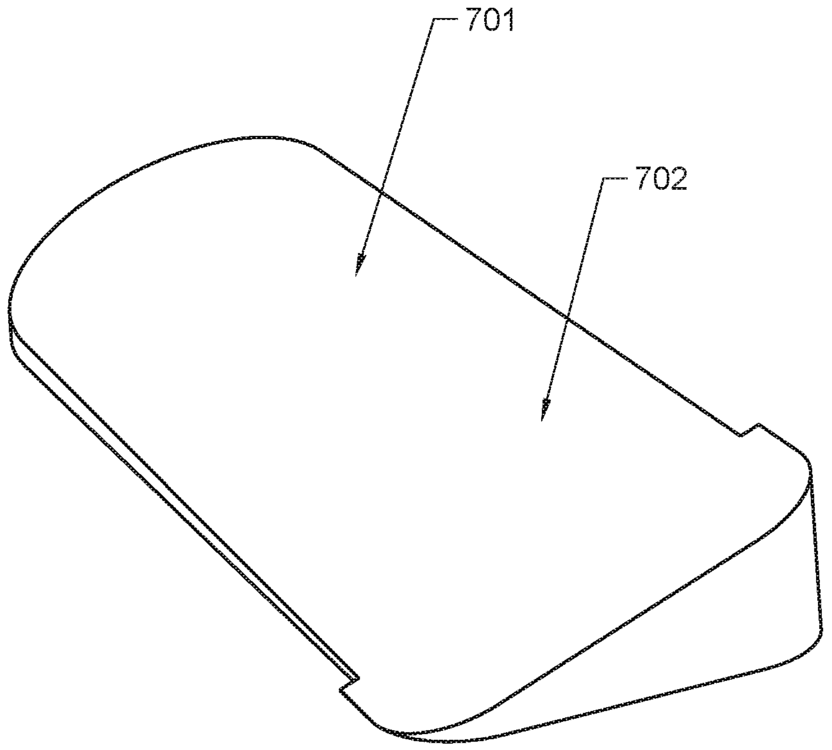
FIG. 11 is an exemplary 3D view of an angle plate with a 20-degree incline.

FIG. 11 is an exemplary 3D view of an angle plate 701 with a 20-degree inclined surface 702.

Explanation of Exemplary Language

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof.

Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts, or aspects of the inventions may be described herein as a preferred arrangement or method, such description is not intended to suggest that such feature is required or necessary unless expressly stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to including all steps as being required in all cases, nor is the order that the steps are presented to be construed as required or necessary unless expressly so stated.

What is claimed is:

1. A calf stretcher device comprising:

a calf brace;

a footrest;

a hinge, the footrest and the calf brace is-connected by the hinge, the hinge having an axis, the footrest and the calf brace rotatable along the axis of the hinge, the calf brace and footrest having a relative angle to each other, the relative angle may change when the footrest and calf brace pivot relative to each other; and an extension longitudinally connected to the footrest.

2. The calf stretcher device of claim 1, further comprising a handle, the handle connected to the extension.

3. The calf stretcher device of claim 2, wherein the handle is perpendicular to the extension.

4. The calf stretcher device of claim 1, further comprising a foot strap, the foot strap is attached to the footrest, the foot strap may secure the foot to the footrest.

5. The calf stretcher device of claim 1, further comprising a calf brace strap, the calf brace strap is attached to the calf brace, the calf brace strap may secure the calf to the calf brace.

6. The calf stretcher device of claim 1, further comprising an angle gauge, the angle gauge measuring the relative angle.

7. The calf stretcher device of claim 6, further comprising a marker fixed on the calf brace and a degree diagram fixed on the footrest, the marker displaying the relative angle, the marker indicates the relative angle measurement on the degree diagram.

8. The calf stretcher device of claim 1, further comprising a hard stop strap, the hard stop strap attached to the calf brace and to the footrest, the hard stop strap providing a limit to the footrest and the calf brace bend relative to each other.

9. The calf stretcher device of claim 8, wherein the hard stop strap is comprised of adjustable multiple connection points.

10. The calf stretcher device of claim 1, further comprising a safety stop, the safety stop being a protruding notch on the footrest, the safety stop providing a limit to the footrest and calf bend relative to each other.

11. The calf stretcher device of claim 1, wherein the hinge is comprised of a molded interlock between the calf brace and footrest.

12. The calf stretcher device of claim 1, further comprising an angle plate, the angle plate installed on the footrest surface.

13. The calf stretcher device of claim 1, wherein the calf brace and the footrest are manufactured of a rigid material.

14. A calf stretcher device comprising:

a calf brace;

a footrest;

a hinge, the footrest and the calf brace connected by the hinge, the hinge having an axis, the footrest and the calf brace rotatable along the axis of the hinge, the calf brace and footrest having a relative angle to each other, the relative angle may change when the footrest and calf brace pivot relative to each other; and an extension longitudinally connected to the footrest, wherein the extension is comprised of a metal rod.

15. A calf stretcher device comprising:

a calf brace;

a footrest;

a hinge, the footrest and the calf brace connected by the hinge, the hinge having an axis, the footrest and the calf brace rotatable along the axis of the hinge, the calf brace and footrest having a relative angle to each other, the relative angle may change when the footrest and calf brace pivot relative to each other; and an extension longitudinally connected to the footrest, wherein the extension is comprised of a metal rod embedded in a second material.

16. A calf stretcher device comprising:

a calf brace;

a footrest;

a hinge, the footrest and the calf brace connected by the hinge, the hinge having an axis, the footrest and the calf brace rotatable along the axis of the hinge, the calf brace and footrest having a relative angle to each other, the relative angle may change when the footrest and calf bend relative to each other;

an extension, the extension longitudinally connected to the footrest;

a handle, the handle connected to the extension, the handle perpendicular to the extension;

a foot strap, the foot strap attached to the footrest;

a calf brace strap attached to the calf brace;

an angle gauge, the angle gauge measuring the relative angle, the angle gauge comprising a marker fixed on the calf brace and a degree diagram fixed on the footrest, the marker displaying the relative angle, the marker indicates the relative angle measurement on the degree diagram; and a hard stop strap attached to the calf brace and to the footrest, the hard stop strap providing a limit to the footrest and the calf brace pivot relative to each other, the hard stop strap is-comprised of adjustable multiple connection points.

17. A calf stretching method comprising:

securing a calf stretcher to a calf and a foot of a person, the calf stretcher comprising a calf brace, a footrest, a hinge, and an extension, the calf brace secured to a calf on a person, the footrest secured to the foot of the person, the footrest and the calf brace is connected by the hinge, the hinge having an axis, the footrest and the calf brace may rotate along the axis of the hinge, the calf brace and footrest having an relative angle to each other, the relative angle may change when the footrest and calf bend relative to each other, the extension longitudinally connected to the footrest; and applying pressure to the extension causing the relative angle between the footrest and the calf brace to decrease and therefore stretching the calf muscle.

18. The calf stretching method of claim 17, further comprising installing an angle plate on the footrest surface prior to securing the calf stretcher.

19. The calf stretching method of claim 17, further comprising measuring the relative angle between the calf brace and the footrest.

* * * * *